(12) United States Patent
Hohnhold et al.

(10) Patent No.: US 10,140,256 B2
(45) Date of Patent: Nov. 27, 2018

(54) LOCATION SPECIFIC CONTENT VISUALIZATION FORMATTING

(71) Applicant: Google LLC, Mountain View, CA (US)

(72) Inventors: Henning Hohnhold, San Francisco, CA (US); Omkar Muralidharan, Sunnyvale, CA (US); Christopher Davis Monkman, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/350,973

(22) Filed: Nov. 14, 2016

(65) Prior Publication Data

US 2017/0255594 A1   Sep. 7, 2017

Related U.S. Application Data

(60) Provisional application No. 62/302,083, filed on Mar. 1, 2016.

(51) Int. Cl.
*G06F 17/21* (2006.01)
*H04L 29/08* (2006.01)
*G06F 17/30* (2006.01)
*G06F 17/22* (2006.01)

(52) U.S. Cl.
CPC ........ *G06F 17/211* (2013.01); *G06F 17/2229* (2013.01); *G06F 17/2247* (2013.01); *G06F 17/30011* (2013.01); *G06F 17/30312* (2013.01); *G06F 17/30864* (2013.01); *H04L 67/1097* (2013.01); *H04L 67/20* (2013.01)

(58) Field of Classification Search
CPC ........... G06F 17/21; G06F 17/22; G06F 17/30
See application file for complete search history.

(56) References Cited

U.S. PATENT DOCUMENTS

| | | | | |
|---|---|---|---|---|
| 8,229,915 B1* | 7/2012 | Lloyd | ................ | G06Q 30/0277 707/609 |
| 8,407,090 B2* | 3/2013 | Kitchen | ................. | G06Q 30/02 705/14.12 |
| 8,423,408 B1* | 4/2013 | Barnes | .................... | G06Q 30/02 455/414.2 |
| 8,892,685 B1* | 11/2014 | Rajkumar | ............. | H04L 9/0861 705/14.2 |
| 2004/0267806 A1* | 12/2004 | Lester | .................... | G06Q 30/02 |

(Continued)

FOREIGN PATENT DOCUMENTS

| | | | | |
|---|---|---|---|---|
| JP | 2002099402 | | 4/2002 | |
| WO | WO-2014004489 A1 * | | 1/2014 | ............. G06Q 30/02 |

*Primary Examiner* — Scott T Baderman
*Assistant Examiner* — Sookil J Lee
(74) *Attorney, Agent, or Firm* — Fish & Richardson P.C.

(57) ABSTRACT

Methods, systems, and apparatus, including computer programs encoded on a computer storage medium, for evaluating digital content. In one aspect, a system includes a distributed computing system that accesses the third-party corpus database to evaluate the various third-party content and transmit, to a user device, digital data that produce visualizations of at least a portion of a set of the various third-party content in a display of the user device. The digital data include instructions that cause presentation of at least some of the visualizations of the various third-party content at the user device according to respective formatting that was selected by the distributed computing system for each of the at least some of the various third-party content.

20 Claims, 3 Drawing Sheets

(56) References Cited

U.S. PATENT DOCUMENTS

| | | | | |
|---|---|---|---|---|
| 2006/0224448 A1* | 10/2006 | Herf | G06F 17/3089 | 705/14.61 |
| 2008/0262913 A1* | 10/2008 | Reitz | G06Q 30/02 | 705/14.36 |
| 2009/0248513 A1* | 10/2009 | Aggarwal | G06Q 30/02 | 705/14.72 |
| 2010/0106595 A1* | 4/2010 | Baugher | G06F 17/3089 | 705/14.42 |
| 2010/0198694 A1* | 8/2010 | Muthukrishnan | G06Q 30/02 | 705/14.71 |
| 2010/0241509 A1* | 9/2010 | Adachi | G06Q 30/02 | 705/14.43 |
| 2011/0040617 A1* | 2/2011 | Moonka | G06Q 30/02 | 705/14.46 |
| 2011/0047026 A1 | 2/2011 | Biggs | | |
| 2011/0072343 A1* | 3/2011 | Baciu | G06Q 30/02 | 715/275 |
| 2011/0191168 A1* | 8/2011 | Schroedl | G06Q 30/0246 | 705/14.45 |
| 2011/0191315 A1* | 8/2011 | Neumeyer | G06Q 30/0243 | 707/706 |
| 2011/0208596 A1* | 8/2011 | Kwon | G06Q 30/02 | 705/14.71 |
| 2012/0310735 A1* | 12/2012 | Kniaz | G06Q 30/02 | 705/14.49 |
| 2013/0111328 A1* | 5/2013 | Khanna | G06F 17/3089 | 715/234 |
| 2013/0204715 A1* | 8/2013 | Zhang | G06Q 30/0241 | 705/14.73 |
| 2014/0122232 A1* | 5/2014 | Press | G06Q 30/0256 | 705/14.54 |
| 2014/0122259 A1* | 5/2014 | Mhatre | G06Q 30/0276 | 705/14.73 |
| 2014/0324599 A1* | 10/2014 | Munoz Torres | G06Q 30/0273 | 705/14.69 |
| 2015/0006280 A1* | 1/2015 | Ruiz | G06Q 30/00 | 705/14.45 |
| 2015/0213504 A1* | 7/2015 | Katz | G06Q 30/0267 | 705/14.64 |
| 2016/0180406 A1* | 6/2016 | Chauhan | G06Q 30/0276 | 705/14.41 |
| 2017/0068644 A1* | 3/2017 | Jones | G06Q 30/0277 | |

* cited by examiner

LOCATION SPECIFIC CONTENT VISUALIZATION FORMATTING

CROSS-REFERENCE TO RELATED APPLICATION

This application claims priority to U.S. Provisional Application No. 62/302,083, filed on Mar. 1, 2016. The disclosure of the prior application is considered part of and is incorporated by reference in the disclosure of this application.

BACKGROUND

This specification relates to dynamic modification of visual content.

As digital communications have grown, content providers have used various techniques to distribute content to end users by placing content in electronic resources ranging from websites to mobile applications. This content is can be stored in data stores and delivered in response to a request for the content. Each piece of content stored will occupy some amount of memory (e.g., Random Access Memory (RAM), Read Only Memory (ROM, solid state memory, or other types of memory), and as the amount of stored content increases, the amount of required memory increases.

SUMMARY

In general, one innovative aspect of the subject matter described in this specification can be embodied in systems that include a third-party corpus database electronically storing various third-party content that are available to be incorporated into an electronic document, where the various third-party content can be indexed in the third-party corpus database according to one or more parameters; a distributed computing system including a set of multiple computing devices that are interconnected and electronically access the third-party corpus database to evaluate the various third-party content, based at least in part on the one or more parameters, and transmit, to a user device, digital data that produce visualizations of at least a portion of a set of the various third-party content in a display of the user device. The digital data can include machine readable instructions that cause the user device to incorporate the visualizations of the set of various third-party content into a presentation of a given electronic document at the user device. The distributed computing system can select the set of various third-party content and dynamically generates the visualizations of at least some of the various third-party content in the set using formatting that is selected based, at least in part, on a location of the electronic document at which the visualization will be presented and prominence provided by other locations of the electronic document (e.g., relative to the prominence provided by the location at which the visualization will be presented). The digital data can include instructions that cause presentation of at least some of the visualizations of the various third-party content at the user device according to respective formatting that was selected by the distributed computing system for each of the at least some of the various third-party content. Other embodiments of this aspect include corresponding methods, apparatus, and computer programs.

These and other embodiments can each optionally include one or more of the following features. One of the computing devices in the distributed computing system can be a server that is configured to segment the evaluation of the various third-party content into multiple separate tasks that are respectively assigned to two or more other computing devices in the distributed computing system. The two or more other computing devices are each configured to separately process the separate tasks that are respectively assigned to the two or more other computing devices, and electronically communicate results of the separate tasks to the server.

The distributed computing system can select the set of various third-party content, formats the at least some of the various third-party content, and transmits the digital data in response to a request for content to be integrated into the electronic document.

Prior to receiving the request for content, the distributed computing system can evaluate multiple different combinations of available formatting and removes, from the available formatting, those combinations that will provide more than a specified amount of prominence at a given location of the electronic document to reduce the amount of time or computing resources required for the distributed computing system to select the formatting used to generate the visualizations of the at least some of the various third-party content.

The distributed computing system can remove, from the available formatting available for a given location of the electronic document, at least one combination of available formatting that will provide a given third-party content a higher level of prominence than is obtainable by the given third-party at a higher location of the electronic document.

The distributed computing system can select the combinations of available formatting that are eligible to be used on a per-query-segment basis based, at least in part, on how many different third-party contents are available to be distributed when each query is received. The combinations of available formatting can increase as a number of different available third-party contents increases.

Another innovative aspect of the subject matter described in this specification can be embodied in methods that include the actions of dynamically formatting visualizations of third-party content by a distributed computing system including the operations of identifying a presentation opportunity for presentation of third-party content in various locations of a given electronic document presented at a user device; evaluating, based on information related to the identified presentation opportunity, a corpus of electronically stored third-party content to identify a set of third-party content eligible to be presented in the given electronic document; dynamically generating visualizations of at least some of the various third-party content in the set using formatting that is selected based, at least in part, on a location of the electronic documents that will present the visualization and prominence provided by other locations of the electronic document; and transmitting, to the user device, machine readable instructions that automatically cause the user device to present at least some of the visualizations of the various third-party content according to respective formatting that was selected for each of the at least some of the various third-party content. Other embodiments of this aspect include corresponding systems, apparatus, and computer programs, configured to perform the actions of the methods, encoded on computer storage devices.

These and other embodiments can each optionally include one or more of the following features. Methods can include receiving a request for content to be integrated into the electronic document. The distributed computing system can select the set of various third-party content, format the at least some of the various third-party content, and transmit the digital data after receiving the request for content to be integrated into the electronic document.

Methods can include prior to receiving the request for content, evaluating, by the distributed computing system, multiple different combinations of available formatting; and removing, from the available formatting and by the distributed computing system, those combinations that will provide more than a specified amount of prominence at a given location of the electronic document to reduce the amount of time or computing resources required for the distributed computing system to select the formatting used to generate the visualizations of the at least some of the various third-party content.

Methods can include determining, for an unformatted visualization of a given third-party content, a first prominence obtainable at a first location of the electronic document; determining, for an unformatted visualization of the given third-party content, a second prominence obtainable at the given location of the electronic document; and setting, for the given third-party content, the specified amount of prominence based on the second prominence and how much higher the first prominence is than the second prominence.

Methods can include selecting the combinations of available formatting that are eligible to be used on a per-query-segment basis based, at least in part, on how many different third-party contents are available to be distributed when each query is received. The combinations of available formatting can increase as a number of different available third-party contents increases.

Methods can include selecting, for a given third-party content, formatting used to generate the visualization of the given third-party content is based on the second prominence.

Methods can include the operations of, for each given third-party content: determining, for each format of the given third-party content, a normalizer for each location of the given electronic document based on a cost of a click when formatted according to the format and presented in the location relative to a cost of a click when presented in the location but not formatted according to the format.

Particular embodiments of the subject matter described in this specification can be implemented so as to realize one or more of the following advantages. The subject matter discussed in this application enables third-party digital content ("third-party content") to be distributed over the Internet within a specified amount of time (e.g., within a time constraint) following a request for the content. For example, the subject matter of this application enables a portion of third-party content to be distributed for inclusion in a web page (or native application) after the web page (or a given portion of the native application) has been requested, rendered and/or presented by a user device. Third-party content can be distributed and/or presented without delaying presentation of the web page (or given portion of the native application) and within a specified amount of time following the user's request for a web page (or given portion of the native application). Providing the third-party content for presentation within the specified amount of time prevents page loading errors (or other errors) that may occur if the third-party content is provided after the specified amount of time, and reduces the likelihood that the third-party content fails to be presented (e.g., due to timeout conditions or the user navigating away from the web page). For example, due to the interactive nature of the Internet, and the user's ability to freely navigate away from a web page (or native application), failure to deliver the third-party content within the specified amount of time increases the likelihood that the third-party content will fail to be presented. This is an issue that has arisen in the context of interactive digital content. Failure to provide the third-party content within the specified amount of time also increases the likelihood that a page load error will occur due to a browser timeout, or another condition. Further failure to provide the third-party content within the specified amount of time increases the likelihood that content of the web page presented at the user device will visually "jump" on the screen or otherwise visually change while the user is viewing the web page. This can lead to errant clicks on content that the user did not intend to click on, thereby resulting in increased network traffic and it can degrade the user experience. In some implementations, the third-party content is selected within one second of the request in order to reduce the likelihood of these potential issues.

To facilitate selection of the third-party content within the specified amount of time, the subject matter described in this document reduces the amount of time required for a data processing apparatus to select content for distribution, for example, by enabling a single portion of content to be dynamically modified after receiving a request for the content rather than requiring each different version of the content to be separately stored and evaluated when a request is received. For example, based on information related to the request, various formatting can be applied to a given portion of third-party content. The formatting that is applied to the given third-party content can vary on a per-request basis, a per-request-type basis, a per-requesting-device-type basis (e.g., mobile, tablet, or desktop), and/or based on the location of a resource at which the given third-party content will be presented. In this way, multiple different versions of the given third-party content can be presented. This results in less latency in outputting third-party content in response to the request for third-party content, which prevents errors (e.g., page load errors, unfilled portions of a web page, or other errors that negatively impact a user's experience) that can be caused by additional latency. Dynamically modifying a given portion of content based, at least in part, on information included in the request can result in lower system latency relative to delivering separately stored versions of the same third party content, for example, because the system that selects and distributes the third-party content need not evaluate each of the different versions of the same third-party content when selecting the third-party content to distribute. Rather, that single instance of the third-party content can be selected for distribution, and then once it is selected, the appropriate formatting can be applied. The subject matter described in this document can also provide a given third-party content as much prominence at a lower position as would be available at a higher position at the same cost, while providing the additional prominence at no additional cost to the content provider.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This document discloses methods, systems, apparatus, and computer readable medium that facilitate distribution of third-party content for integration into an electronic document. The electronic document can be provided by a publisher, and the third-party content can be provided by an entity (e.g., a third-party) that differs from the publisher. As discussed in more detail below, the selection of the third-party content can be performed by a set of computing devices (e.g., specially programmed and/or configured devices) using an evaluation process. For example, the evaluation process can select third-party content to be provided in response to a request, and then determine formatting to be used when creating a visualization of the third-party content that will be presented in a display of a client device. The formatting can be selected, for example, based on a prominence provided by a particular position on the electronic document, prominence provided by other available positions in the electronic document, and/or formatting that can be applied to third-party content presented in the other available positions. In some situations, this evaluation leads to some third-party content being provided some amount of prominence for free, while preserving a certain level of expenditure.

The evaluation process can be carried out in a distributed computing environment, and using information from millions of available portions of third-party content. The evaluation process can be performed, for example, after a user device requests presentation of the electronic document and in near real-time, so that the selected third-party content is presented at the user device with the electronic document. As discussed in more detail below, the third-party content that are selected for distribution are dynamically formatted based on information associated with the request for third-party content so that various different versions of a given third-party content can be distributed, while not requiring each different version of the third-party content to be stored. By reducing the number of versions of third-party content that are stored, the selection process (e.g., identifying which of the third-party content will be distributed) can be performed in less time than it would take to evaluate all of the different versions of the various third party content, thereby improving the performance of a computer system.

Figure 1:
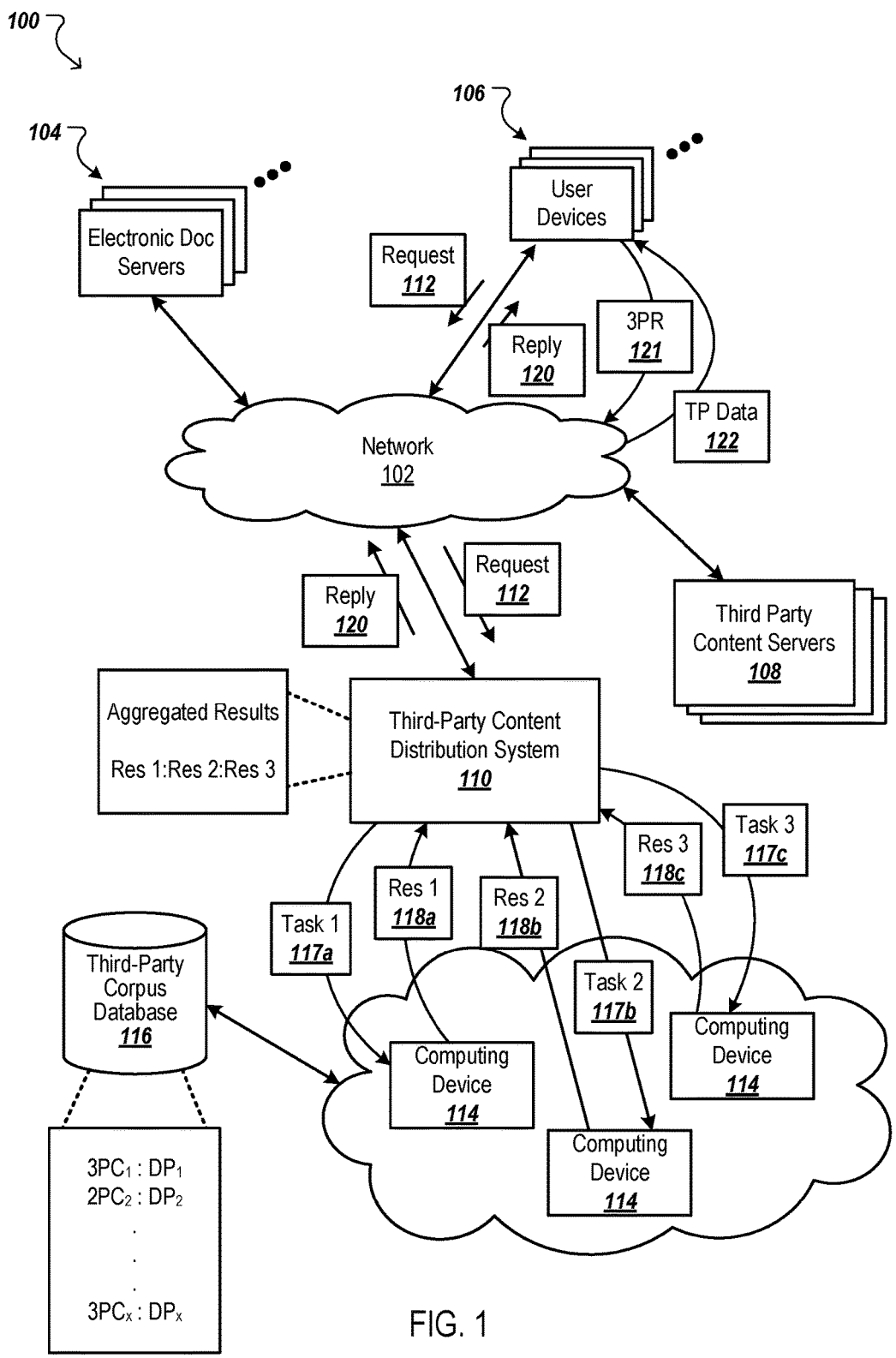
FIG. 1 is a block diagram of an example environment in which content is distributed.

FIG. 1 is a block diagram of an example environment 100 in which third-party content is distributed for presentation with electronic documents. The example environment 100 includes a network 102, such as a local area network (LAN), a wide area network (WAN), the Internet, or a combination thereof. The network 102 connects electronic document servers 104, user devices 106, third-party content servers 108, and a third-party content distribution system 110 (also referred to as a content distribution system). The example environment 100 may include many different electronic document servers 104, user devices 106, and third-party content servers 108.

A user device 106 is an electronic device that is capable of requesting and receiving resources over the network 102. Example user devices 106 include personal computers, mobile communication devices, and other devices that can send and receive data over the network 102. A user device 106 typically includes a user application, such as a web browser, to facilitate the sending and receiving of data over the network 102, but native applications executed by the user device 106 can also facilitate the sending and receiving of data over the network 102.

An electronic document is data that presents a set of content at a user device 106. Examples of electronic documents include webpages, word processing documents, portable document format (PDF) documents, images, videos, search results pages, and feed sources. Native applications (e.g., "apps"), such as applications installed on mobile, tablet, or desktop computing devices are also examples of electronic documents. Electronic documents can be provided to user devices 106 by electronic document servers 104. For example, the electronic document servers 104 can include servers that host publisher websites. In this example, the user device 106 can initiate a request for a given publisher webpage, and to the electronic server 104 that hosts the given publisher webpage can respond to the request by sending machine executable instructions that initiate presentation of the given webpage at the user device 106.

In another example, the electronic document servers 104 can include app servers from which user devices 106 can download apps. In this example, the user device 106 can download files required to install an app at the user device 106, and then execute the downloaded app locally.

Electronic documents can include a variety of content. For example, electronic document can include static content (e.g., text or other specified content) that is within the electronic document itself and/or does not change over time. Electronic documents can also include dynamic content that may change over time, on a per-request basis, or on other factors (e.g., a type of device on which the content will be presented, a time of day, a day of week, a geographic location of the user device, and so on). For example, a publisher of a given electronic document can maintain a data source that is used to populate portions of the electronic document. In this example, the given electronic document can include a tag or script that causes the user device 106 to request content from the data source when the given electronic document is processed (e.g., rendered or executed) by a user device 106. The user device 106 integrates the content obtained from the data source into the given electronic document to create a composite electronic document including the content obtained from the data source.

In some situations, a given electronic document can include a third-party tag or third-party script that references the third-party content distribution system 110. In these situations, the third-party tag or third-party script is executed by the user device 106 when the given electronic document is processed by the user device 106. Execution of the third-party tag or third-party script configures the user device 106 to generate a request for third-party content 112, which is transmitted over the network 102 to the third-party content distribution system 110. For example, the third-party tag or third-party script can enable the user device 106 to generate packetized data request including a header and payload data. The request 112 can include data such as a name (or network location) of a server from which the third-party content is being requested, a name (or network location) of the requesting device (e.g., the user device 106), and/or information that the third-party content distribution system 110 can use to select third-party content provided in response to the request. The request 112 is transmitted, by the user device 106, over the network 102 (e.g., a telecommunications network) to a server of the third-party content distribution system 110.

The server can segment the evaluation of the various third-party content into multiple separate tasks that are respectively assigned to two or more other computing devices in the distributed computing system. In some implementations, the two or more other computing devices can each separately process the separate tasks that are respectively assigned to the two or more other computing devices and to electronically communicate results of the separate tasks to the server.

Prior to receiving the request for content, the distributed computing system can evaluate multiple different combinations of available formatting and remove, from the available formatting, those combinations that will provide more than a specified amount of prominence at a given location of the electronic document. This can reduce the amount of time or computing resources required for the distributed computing system to select the formatting used to generate the visualizations of the at least some of the various third-party content. This can effectively produce, for example, a filtering of the combinations of formatting available to reduce processing at query time.

The distributed computing system can remove, from the available formatting available for a given location of the electronic document, at least one combination of available formatting that will provide a given third-party content a higher level of prominence than is obtainable by the given third-party at a higher location of the electronic document. This is a way, for example, to keep from providing more prominence at a lower position than a content provider could obtain at a higher position, e.g., by comparing the prominence that content X will get in slot 2 with formatting relative to the prominence provided in slot 1.

In some implementations, the distributed computing system can select the combinations of available formatting that are eligible to be used on a per-query-segment basis based, at least in part, on how many different third-party contents are available to be distributed when each query is received, wherein the combinations of available formatting increase as a number of different available third-party contents increases. The request 112 can include data specifying the electronic document and characteristics of locations at which third-party content can be presented. For example, data specifying a reference (e.g., URL) to an electronic document (e.g., webpage) in which the third-party content will be presented, available locations of the electronic documents that are available to present third-party content, sizes of the available locations, and/or media types that are eligible for presentation in the locations can be provided to the content distribution system 110. Similarly, data specifying keywords associated with the electronic document ("document keywords") or entities (e.g., people, places, or things) that are referenced by the electronic document can also be included in the request 112 (e.g., as payload data) and provided to the content distribution system 110 to facilitate identification of content items that are eligible for presentation with the electronic document.

Requests 112 can also include data related to other information, such as information that the user has provided, geographic information (e.g., geolocation data from a GPS device that is included in the user device) indicating a state or region from which the request was submitted, or other information that provides context for the environment in which the third-party content will be displayed (e.g., a type of device at which the third-party content will be displayed, such as a mobile device or tablet device). Requests 112 can be transmitted, for example, over a packetized network, and the requests 112 themselves can be formatted as packetized data having a header and payload data. The header can specify a destination of the packet and the payload data can include any of the information discussed above.

The third-party content distribution system 110 chooses third-party content that will be presented with the given electronic document in response to receiving the request 112 and/or using information included in the request 112. In some implementations, the third-party content is selected in less than a second to avoid errors that could be caused by delayed selection of the third-party content. For example, delays in providing third-party content in response to a request 112 can result in page load errors at the user device 106 or cause portions of the electronic document remain unpopulated even after other portions of the electronic document are presented at the user device 106. Also, as the delay in providing third-party content to the user device 106 increases, it is more likely that the electronic document will no longer be presented at the user device 106 when the third-party content, thereby negatively impacting a user's experience with the electronic document. Further, delays in providing the third-party content can result in a failed delivery of the third-party content, for example, if the electronic document is no longer presented at the user device 106 when the third-party content is provided.

In some implementations, the third-party content distribution system 110 is implemented in a distributed computing system that includes, for example, a server and a set of multiple computing devices 114 that are interconnected and identify and distribute third-party content in response to requests 112. The set of multiple computing devices 114 operate together to identify a set of third-party content that are eligible to be presented in the electronic document from among a corpus of millions of available third-party content ($3PC_{1-x}$). The millions of available third-party content can be indexed, for example, in a third-party corpus database 116. Each third-party content index entry can reference the corresponding third-party content and/or include distribution parameters (DPi-DPx) that condition the distribution of the corresponding third-party content.

In some implementations, the multiple computing devices 114 can electronically access the third-party corpus database 116 to evaluate the various third-party content, based at least in part on the one or more parameters. The multiple computing devices 114 can transmit, to a given user device 106, digital data that produce visualizations of at least a portion of a set of the various third-party content in a display of the user device. For example, the digital data can include machine readable instructions that cause the user device to incorporate the visualizations of the set of various third-party content into a presentation of a given electronic document at the user device. The distributed computing system can select the set of various third-party content and dynamically generate the visualizations of at least some of the various third-party content in the set using formatting that is selected based, at least in part, on a location of the electronic document at which the visualization will be presented and prominence provided by other locations of the electronic document. The digital data can include instructions that cause presentation of at least some of the visualizations of the various third-party content at the user device according to respective formatting that was selected by the distributed computing system for each of the at least some of the various third-party content.

In some implementations, the distribution parameters for a particular third-party content can include distribution keywords that must be matched (e.g., by electronic documents or terms specified in the request 112) in order for the third-party content to be eligible for presentation. The distribution parameters can also require that the request 112 include information specifying a particular geographic region (e.g., country or state) and/or information specifying that the request 112 originated at a particular type of user device (e.g., mobile device or tablet device) in order for the third-party content to be eligible for presentation. The distribution parameters can also specify a bid and/or budget for distributing the particular third-party content.

The identification of the eligible third-party content can be segmented into multiple tasks 117a-117c that are then assigned among computing devices within the set of multiple computing devices 114. For example, different computing devices in the set 114 can each analyze a different portion of the third-party corpus database 116 to identify various third-party content having distribution parameters that match information included in the request 112. In some implementations, each given computing device in the set 114 can analyze a different data dimension (or set of dimensions) and pass results (Res 1-Res 3) 118a-118c of the analysis back to the third-party content distribution system 110. For example, the results 118a-118c provided by each of the computing devices in the set may identify a subset of third-party content that are eligible for distribution in response to the request and/or a subset of the third-party content that have certain distribution parameters or attributes.

The third-party content distribution system 110 aggregates the results 118a-118c received from the set of multiple computing devices 114 and uses information associated with the aggregated results to select one or more third-party contents that will be provided in response to the request 112. For example, the third-party content distribution system 110 can select a set of winning third-party content based on the outcome of a content evaluation process, as discussed in further detail below. In turn, the third-party content distribution system 110 can generate and transmit, over the network 102, reply data 120 (e.g., digital data representing a reply) that enable the user device 106 to integrate the set of winning third-party content into the given electronic document, such that the set of winning third-party content and the content of the electronic document are presented together at a display of the user device 106.

In some implementations, the user device 106 executes instructions included in the reply data 120, which configures and enables the user device 106 to obtain the set of winning third-party content from one or more third-party content servers. For example, the instructions in the reply data 120 can include a network location (e.g., a Uniform Resource Locator (URL)) and a script that causes the user device 106 to transmit a third-party request (3PR) 121 to the third-party content server 108 to obtain a given winning third-party content from the third-party content server 108. In response to the request, the third-party content server 108 will transmit, to the user device 106, third-party data (TP Data) 122 that causes the given winning third-party content to be incorporated to the electronic document and presented at the user device 106. The incorporation of the third-party content into the electronic document results in the creation of a composite document that includes data from various different sources.

The content distribution system 110 can utilize one or more evaluation processes to identify and select the set of winning third-party content for each given request (e.g., based on data corresponding to the request). In some implementations, the evaluation process is not only required to determine which third-party content to select for presentation with the electronic document, but also the type of formatting that will be dynamically (e.g., on a per-request basis) applied to the selected third-party content, and the price that will be paid for presentation of the selected third-party content when presented with the applied formatting. The dynamic formatting is applied to the selected third-party content can change a visual characteristic of the third-party content on a per-presentation-opportunity basis, such that the third-party content can have a different appearance depending on the presentation opportunity.

The formatting options applied to each third-party content can include, for example, an amount of display space utilized to present the third-party content, text font options (e.g., text size and/or style such as bold, italics, or color), sizes of images included in the third-party content, a number of active links (e.g., links that enable the user device to take an action, such as contacting a remote server) that are included in the third-party content, a number of other items (e.g., maps, factual information, directions, phone numbers, or interactive elements) that are appended to or otherwise included in the third-party content, or animation applied to a portion of the third-party content.

The formatting of each third-party content can affect a level of prominence or the third-party content. For example, the level of prominence for a given third-party content that is presented in a larger portion of the display space, will generally be higher than the level of prominence for the given third-party content if it is presented in a smaller portion of the display space. Similarly, formatting the given third-party content to include interactive elements (e.g., visual buttons that when clicked cause the user device to take an action) or other additional elements such as those listed above, will generally provide the given third-party content a higher level of prominence relative to the level of prominence of the given third-party content absent the formatting. The location within the electronic document at which the given third-party content is presented will also affect its level of prominence. For example, the level of prominence for the given third-party content at one display location (e.g., a banner location of the electronic document) may be higher than the level of prominence for the given third-party content at a different display location (e.g., a display location that is further down the page or below the fold).

In some situations, a third-party will pay a certain amount in order for their third-party content to be presented at a given display location. For example, based on the outcome of a single evaluation process, a given third-party may pay the minimum amount required to obtain the given display location (e.g., an amount that is just higher than the amount another third-party is willing to pay for the given display location). In this example, the amount paid by the given third-party considers the prominence provided by the given display location (e.g., the free prominence provided when the given display location is obtained), but does not necessarily take into account formatting that may be applied to the third-party content is presented in the given display location. As such, using the single evaluation process in this example, may result in the presentation of less desirable third-party content (e.g., because the formatting of the presented third-party content may not provide as much prominence as the formatting applied to a different third-party content) and/or improper pricing of third-party content presentations.

One option for taking formatting options into account during the evaluation of third-party content is to perform a combinatorial selection process (e.g., a combinatorial auction). In the combinatorial selection process, a separate value can be assigned to each combination of available presentation locations, third-party contents, and formatting options. However, as the number of available presentation locations, third-party contents, and formatting options increase so does the computation complexity of obtaining a result using a combinatorial selection process. As such, using a combinatorial selection process may not be feasible depending on the time constraints within which third-party content must be selected and/or available computing resources.

To facilitate presentation of various different versions of a given third-party content (e.g., with various formatting applied), different visualizations of the third-party content can be generated based, at least in part on information included in the request for third-party content. For example, as discussed in more detail below, information about the prominence that a given portion of third-party content would receive at various locations of an electronic document can be used for determining what formatting will be applied to the third-party content when that third-party content has been selected for presentation in a given location of the electronic document. More specifically, some initial amount of formatting (e.g., baseline formatting) may be applied to the given third-party content to ensure that it receives at least a minimum level of prominence. Additional formatting may then be applied to the given third-party content to increase the prominence of the given third-party content. The amount of additional formatting that is applied to the given third-party content in a given location of the electronic document may be limited to a combination of formatting that provides no more than the amount of prominence that the third-party content would obtain in a next higher location of the third-party content. Note that the minimum amount of formatting (e.g., the baseline formatting) may be applied without affecting the amount paid for distribution of the third-party content, while the amount paid for distribution of the third-party content may be increased for the additional formatting.

In some implementations, the price to be paid for distribution of a given third-party content can be determined based on the prominence associated with the distribution, among other factors. Prominence, for example, can be indicative of a visual quality of content, e.g., associated with the content's position on a web page, its visibility, it noticeability, and other user-perceivable factors. In some implementations, the prominence of a given portion of content (or presentation location) can be measured based, at least in part, on a number of user interactions (e.g., clicks) with the given portion of content (or presentation location) or an interaction rate (e.g., click-through-rate) for the given portion of content (or presentation location). For example, content (or a presentation location) with a higher number of interactions or a higher interaction rate may have a higher prominence than other content (or presentation locations) having a lower number of interactions or interaction rate. Further, the prominence of a given portion of content can vary in proportion to a conversion rate or another measure of successful transactions associated with the given portion of content.

The cost of distributing third-party content can increase as the level of prominence increases. Additionally, the cost of distributing a given third-party content can be based, at least in part on a type of user interaction that is performed. For example, some types of interactions with third-party content are more valuable (e.g., lead to more transactions) than other types of interactions, such that the price paid for those types of interactions may be higher. Similarly, the amount paid to format a given third-party content to incorporate capability for a user to perform these higher valued interactions can be higher than the amount paid to format the given third-party content with less valuable interaction capabilities.

Assume for purposes of example, that a "click to call" interaction is much more valuable than interaction with a "get directions" button that can be included in the given third party content. Further assume that various formatting options exist to incorporate "click to call" and "get directions" functionality into the given third-party content. In this example, the amount (e.g., price) required to incorporate the "click to call" functionality into the given third party content may be higher than the amount required to incorporate the "get directions" functionality, thereby taking into consideration the different values provided by the two different formatting options. In some implementations, the formatting applied to a given third-party content is constrained by the maximum amount that a content provider (e.g., advertiser) will pay for distribution of the given third-party content (e.g., if the cost of the additional formatting will cause the total CPC to exceed the maximum CPC associated with the given third-party content, then the formatting may not be applied).

In some implementations, the formatting that is applied to a given third-party content can be selected (or constrained) based on various other considerations. For example, formatting selected to be applied to various third-party content can be chosen in a manner that maintains probabilistic click-through rate (PCTR) monotonicity among the locations of the electronic document. For example, suppose a click lift (e.g., increased number of clicks) of going from position X to a higher position X–1 (e.g., on a web page) with no formats is C. The third-party content distribution system 110 may not allow formats in position X that increase the prominence of third-party content more than C over the prominence provided to that third-party content by the position X absent formatting.

As noted above, some prominence can be provided for free, without an increase in CPC paid by a content provider. For example, some policies may stipulate that the CPC of third-party content will not be increased for the first k % of prominence that is provided to the third-party content in a given position, where k can vary by position. This can lead to a greater number of user interactions with the content. This can also lead to more opportunities to display content in those positions as well as other positions on the page.

In some implementations, a parameter "alpha" may be used, in part, to select the formatting that will be dynamically applied to a given third-party content for a given presentation opportunity (or class of presentation opportunities). Alpha can be defined, for example, as a linear relationship that increases as a function of prominence. For purposes of example, assume the following:

An amount of baseline prominence in higher position X–1 is K Baseline prominence is the prominence provided to third-party content presented in a given location independent of any prominence that may be separately purchased by a third-party content provider.

The "vanilla" lift from position X to position X–1 is C. The vanilla lift does not include the free formatting (e.g., baseline formatting) in the above position.

An amount of baseline prominence in a lower position X is k.

The third-party content distribution system 110 is looking at a format combination in position X with prominence p and CTR lift L.

In this example, the third-party content distribution system can prevent application of any formatting combinations that result in p>=C*K (or some other function ƒ(C,K), e.g., C+K) that maintains pCTR monotonicity.

In some implementations, we can utilize "alpha" to rank various third-party content and/or select formatting that will be dynamically applied to the various third-party content to generate various versions of the various third-party content. In the following example, let raw_alpha be the alpha that is desired to be set. Without linear alpha, raw_alpha is just a constant. However, with linear alpha, raw_alpha (e.g., a marginal cost of format) is given by relationship (1):

$$raw\_alpha = 1 + slope * max(0, p-k) \quad (1)$$

The slope can be, for example, a constant that provides useful overall metrics for relationship (1) and can be derived based on tuning and/or through experimentation.

In some implementations, other ways can be used to determine raw_alpha. For example, other more complicated functions can be used to determine the increased marginal cost of a format, e.g., as a function of prominence. In some implementations, normalizers can be used, such as to determine rank scores for selecting content. Each normalizer can be determined, for example, for each combination of third-party content, a presentation location, and formatting applied to the third-party content. Further, the normalizer can be determined based on values associated with prominence. For example, each normalizer N can be determined using relationship (2).

$$N = [1 + raw\_alpha * max(0, p-k) + min(L, p, k)] \quad (2)$$

where:
p is prominence,
k is an amount of free prominence in position X (e.g., the position under consideration), and
L is CTR lift.

Using this value of N, for example, alpha can be determined according to relationship (3).

$$alpha = (N-1)/p \quad (3)$$

Substitution of values from relationship (2) into relationship (3) results in relationship (4).

$$Alpha = [raw\_alpha * max(0, p-k) + min(L, p, k)]/p \quad (4)$$

In some implementations, CPC of a given third-party content can vary based on various properties. For example, the CPC of a given third-party content that changes due to formatting applied to that given third-party content can be governed by a multiplier value such as N/(1+L), where N is a normalizer and L is CTR lift. In some implementations, such a multiplier value can be multiplied with an existing CPC to determine a new CPC (e.g., based on a format change).

Example pseudo-code for implementing the subject matter discussed above is provided below for purposes of example. The pseudocode includes baseline prominence (e.g., "BaselineProminence") applied to third-party content, which is represented by A. Additionally, F refers to a format combination, and vanilla Pctr is the Pctr associated with a given location (e.g., without additional formatting applied to third-party content).

```
For presentation location (or position) (L) = 1...N
    For each third-party content (A)
        BaselineProminence = BaselineProminence [A, L] #
        Possibly a
function of third-party content, query in addition to position.
        # Calculate format cap
        If L = 1
            Cap = Inf
        Else
            PositionLift = VanillaPctr[A, L-1] / VanillaPctr[A, L]
            BaselineProminenceAbove = BaselineProminence [A, L-1]
            # e.g., 1.3
            Cap = BaselineProminenceAbove * PositionLift
        For each format combination F
            If Prominence[F] > Cap:
                Disallow F
            Else:
                Raw Alpha = 1 + Slope * max(0, Prominence[A, F] -
BaselineProminence)
                # Alternatively, could set RawAlpha = constant
                N = 1 + Raw Alpha * max(0, Prominence[A, F] -
                BaselineProminence)
    + min(Lift[A, F], Prominence[A, F], BaselineProminence)
                Alpha[A, L, F] = (N - 1) / Prominence[F]
```

The third-party content selection process can be run with parameters Alpha[A, L, F]. In some implementations, some of the terms in the pseudo-code can be replaced with other terms, such as using Prominence[A,L,F] (e.g., prominence of a given combination of Third-Party Content (A), Presentation Location (L), and Formatting (F)), or Prominence[A, F] instead of Prominence[F]. Another change in terms can use Lift[A,L,F] in place of Lift[A,F]. Other changes to the pseudo-code are possible.

In some implementations, the third-party content selection process ranks the available third-party content based on rank scores that are determined for each third-party content as a mathematical product of the alpha for the third-party content and the maximum CPC (or other specified bid) for that third-party content.

Figure 2:
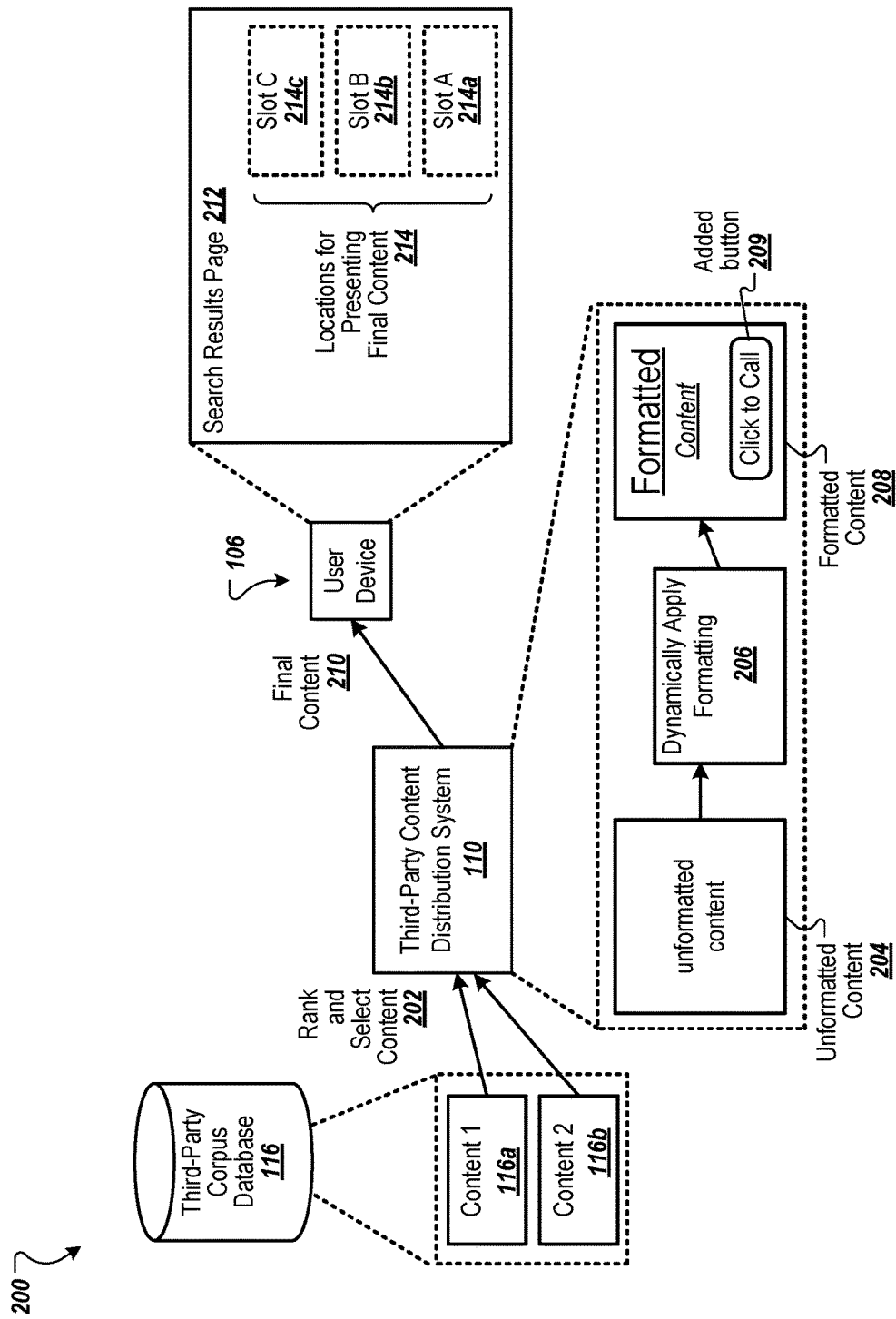
FIG. 2 is a block diagram showing an example process for dynamically formatting content.

FIG. 2 is a block diagram showing an example process 200 for dynamically formatting content. For example, the third-party content distribution system 110 can rank and select (202) third-party content 116a and 116b, or other third-part content from the third-party corpus database 116. Some of the content 116a and 116b can be re-formatted before a visualization of the third-party content is sent as final content 210 for presentation on a web page (e.g., search results page 212). For example, the third-party content distribution system 110 can dynamically apply formatting (206) to original, unformatted content 204, e.g., containing simple, unformatted text or an image. The result of applying formatting (206) is formatted content 208, e.g., including bolding or text and/or other formatting (such as visually emphasizing portions of the content or embedded functionality that was not included in the unformatted content 204, e.g., click-to-call functionality, generate e-mail functionality, etc.) that can increase the content's prominence. This is because formatted content (e.g., an advertisement) is generally more prominent than an otherwise unformatted ad. In some implementations, applying formatting (206) can include the addition of interactive user interface controls or other elements, such as a click-to-call button 209 or other controls, maps, directions, links to other pages, and/or other added elements. As a result, added formatting may not only change, for example, the visual appearance of an ad, but may also change the functionality of the content, e.g., by enabling a user interacting with the content to initiate a call, request a map, get directions, or perform some other task. As such, the formatting may modify operations that are triggered when a user interacts with the formatted content 208. For example, a code snippet or script can be embedded into the third-party content, and interaction with the formatted content (e.g., interaction with a user interface element associated with the code snippet or script) will trigger execution of the code snippet or script, which causes the user device to perform a specified task (e.g., initiate a phone call using telephone hardware included in the user device or to generate an e-mail using a mail application installed on the user device).

The unformatted content 204 may have an original prominence P1, for example, and the formatted content 208 may have a prominence of up to P2 (e.g., greater than prominence P1), where P2 is the prominence that the content would have in slot B 214b. The third-party content distribution system 110 can allow the prominence to be increased in this way without increasing the content's CPC. For example, associated with the locations for presenting content 214, there is a prominence P1 for slot A 214a, prominence P2 for slot B 214b, and prominence P3 for slot C 214c, where P3≤P2≤P1. At the time of a request for content associated with the search results page 212, for example, there may be a limit of formatting available in slot B 214b, which can be based on the prominence P3 of slot C 214c. There is a difference C between the prominence P2 that slot B 214b provides (for the content) and the prominence that the content would be provided if presented at slot C 214c, and this difference can be used for purposes of selecting the baseline prominence that will be applied to content when presented in slot B 214b, as discussed in more detail below. In some implementations, C can be used to adjust the baseline prominence for slot C 214c. This is because if C is small, not as many formats can be shown in slot B 214b. Slot C 214c can be given a higher baseline prominence so that more formats can be shown in slot B 214b.

Figure 3:
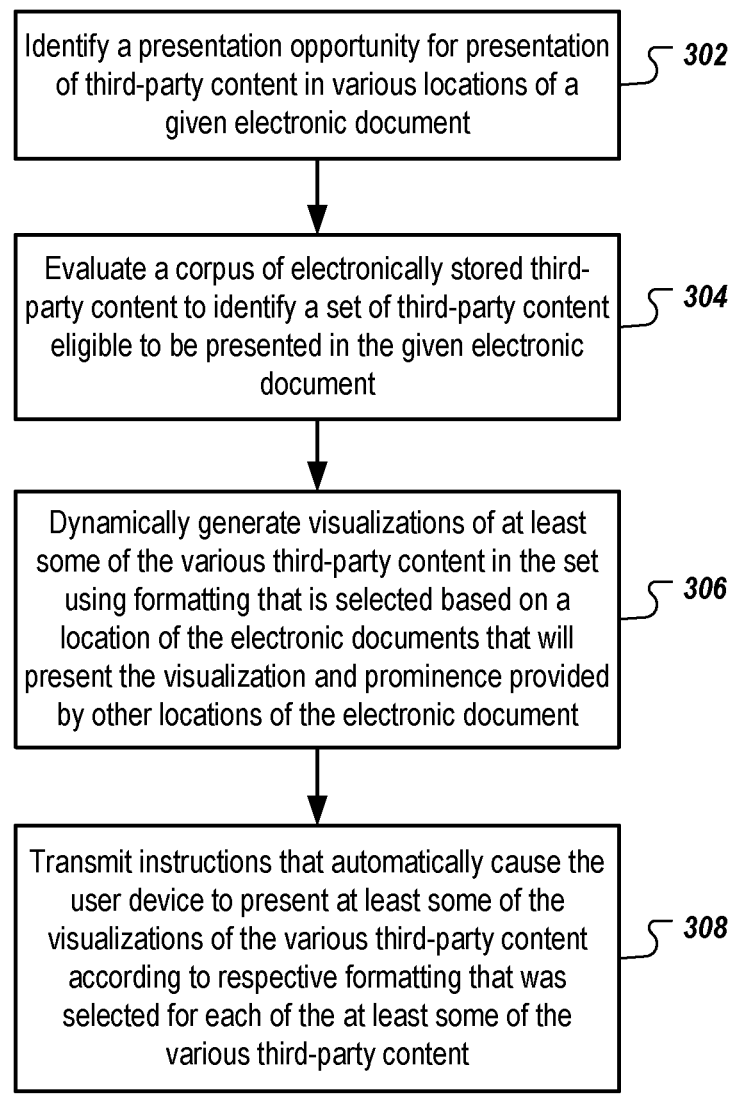
FIG. 3 is a block diagram of an example process for dynamically formatting visualizations of third-party content to be incorporated into an electronic document.

FIG. 3 is a block diagram of an example process 300 for dynamically formatting visualizations of third-party content to be incorporated into an electronic document. The process 300 can be implemented using a specially configured distributed computing system that selects winning third-party content within a specified amount of time following a request for third-party content (e.g., within a specified latency constraint). For example, the process 300 can be implemented using the content distribution system 110 of FIG. 1, which includes multiple data processors and one or more storage devices (e.g., physical memory devices). Operations of the process 300 can also be implemented as instructions encoded on a non-transitory computer readable medium. Execution of the instructions by a distributed computing system cause the distributed computing system to perform operations of the process 300.

A presentation opportunity is identified for presentation of third-party content in various locations of a given electronic document presented at a user device. (302). In some implementations, the opportunity to automatically incorporate third-party content into the electronic document is identified based on the identification of a presentation opportunity, e.g., by the third-party content distribution system 110. The presentation opportunity can be identified, for example, based on receipt of a request for third-party content to be presented in the electronic document. For example, when a user device requests presentation of an electronic document, a script embedded in the electronic document may be executed by the user device. Execution of the script can automatically cause the user device to submit a request for third-party content to be incorporated into the presentation of the electronic document. This request can include various information as discussed above with reference to FIG. 1. Additionally, or alternatively, the opportunity to automatically incorporate third-party content into the electronic document may be identified based on evaluation of a user's interaction with a native application. For example, when a user opens a social networking native application on their device, information related to posts of that user's social network contacts (or other information associated with the user's social network account or the application itself) may indicate that there is an opportunity to incorporate third-party content into the user's social network feed or in other sections of the application. The various locations associated with the presentation opportunity can correspond, for example, with positions X and X-1 described above with reference to relationships (1)-(4).

A corpus of electronically stored third-party content is evaluated to identify a set of third-party content eligible to be presented in the given electronic document (304). The evaluating is based on information related to the identified presentation opportunity. In some implementations, the corpus of electronically stored third-party content are evaluated based on information related to the identified presentation opportunity. For example, as discussed above with reference to FIG. 1, the electronically stored third-party content having distribution parameters that are matched by information corresponding to a presentation opportunity may be identified as eligible third-party content.

Visualizations of at least some of the various third-party content in the set are dynamically generated using formatting that is selected based, at least in part, on a location of the electronic documents that will present the visualization and prominence provided by other locations of the electronic document (306). For example, to dynamically generate the visualizations, the third-party content distribution system 110 can follow the considerations described above, including baseline prominence considerations, as described above. Further, the third-party content distribution system 110 can determine, for example, a prominence for position C using relationships (1)-(4).

Machine readable instructions are transmitted, to the user device that automatically cause the user device to present at least some of the visualizations of the various third-party content according to respective formatting that was selected for each of the at least some of the various third-party content (308). In certain situations, the transmission of the machine readable instructions must occur within a latency constraint.

In some implementations, pre-processing can occur (e.g., before requests for content are received) on third-party content in order to eliminate formatting combinations that are infeasible for selection. For example, prior to receiving the request for content, the third-party content distribution system 110 can evaluate multiple different combinations of available formatting. The third-party content distribution system 110 can remove, from available formatting combinations, any combinations that will provide more than a specified amount of prominence at a given location of the electronic document. For example, a combination that produces an increase in prominence that violates the conditions above (e.g., with respect to allowable free prominence described above with reference to the relationships (1)-(4)) will be discarded. In some implementations, removal of formatting combinations can be based on the relationships (1)-(4) described above. This pre-processing can reduce the amount of time or computing resources required, at content request time, to select the formatting used to generate the visualizations of the at least some of the various third-party content. For example, by removing, prior to runtime, combinations of formatting that may not be used when relationships (1)-(4) are used, the system will generally require less processing time and/or resources to select a formatting combination at runtime. This improves the functioning of the computer by enabling the computer to provide runtime decisions in near real-time, and within a latency constraint for distributing content for presentation with a requested electronic document.

In some implementations, determining prominence can be based on the relationships (1)-(4) described above. For example, for an unformatted visualization of a given third-party content, the third-party content distribution system 110 can determine a first prominence obtainable at a first location (e.g., position X−1) of the electronic document. A second prominence obtainable at the given location of the electronic document, e.g., at position X can be determined for an unformatted visualization of the given third-party content. Then, for the given third-party content, the specified amount of prominence that will be applied to the third-party content when presented at position X can be set based on the second prominence and how much higher the first prominence is than the second prominence. For example, in this way, the third-party content distribution system 110 can identify a format combination in position X with prominence p and CTR lift L, as described above.

In some implementations, position prominence can be related to format prominence and lift. For example, format prominence and lift for a given presentation location can be determined based on a click difference for content in position X with no format versus position X with the formatting. In some implementations, click differences can be determined by randomly (or selectively) turning off formats at the given presentation location and measuring click differences between content presentations when formatting is available relative to content presentations when formatting is not available. Machine learning can be used to predict the lift. In some situations, the prominence can be equal to the lift for the format. In some situations, prominence and lift can differ, for example, when considerations such as increases in conversion rates corresponding to the formatting are taken into consideration. For example, click-to-call formatting, which enables a user to place a call through user interaction with the applied formatting, can increase conversion rates substantially (e.g., determined from aggregated click-to-call data), and this increased conversion rate can lead to differences between prominence and lift.

In some implementations, the selection of prominence and formatting can be affected, e.g., based on the existence of other third-party content that can be selected for inclusion on an electronic document. For example, the process 300 can further include selecting the combinations of available formatting that are eligible to be used on a per-query-segment basis, the selecting being based, for example, on how many different third-party contents are available to be distributed when each query is received. In some implementations, the combinations of available formatting can increase as a number of different available third-party contents increases.

An electronic document (which for brevity will simply be referred to as a document) does not necessarily correspond to a file. A document may be stored in a portion of a file that holds other documents, in a single file dedicated to the document in question, or in multiple coordinated files.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system comprising:
   a third-party corpus database electronically storing various third-party content that are available to be incorporated into an electronic document, wherein the various third-party content are indexed in the third-party corpus database according to one or more parameters; and
   a distributed computing system including a set of multiple computing devices that are interconnected and electronically access the third-party corpus database to evaluate the various third-party content, based at least in part on the one or more parameters, and transmit, to a user device, digital data that produce visualizations of at least two of the various third-party content together in a display of the user device, wherein:
   the digital data include machine readable instructions that cause the user device to incorporate the visualizations of the at least two of the various third-party content into a particular presentation of a given electronic document at the user device;
   the distributed computing system:
   selects the at least two of the various third-party content and determines a given level of prominence provided by a first presentation location of the given electronic document that is assigned to one of the at least two of the various third-party content for the particular presentation;

selects, for a given third-party content that is assigned a second presentation location of the given electronic document, formatting of the given third-party content that increases a level of prominence of the given third-party content over the level of prominence that is provided by the second presentation location, but limits the level of prominence of the given third-party content to less than the given level of prominence provided by the first presentation location of the given electronic document, and dynamically generates a visualization of the given third-party content using the formatting that was selected for the given third-party content; and the digital data include instructions that cause presentation of at least some of the visualizations of the various third-party content at the user device according to respective formatting that was selected by the distributed computing system for each of the at least some of the various third-party content.

2. The system of claim 1, wherein one of the computing devices in the distributed computing system is a server that is configured to segment the evaluation of the various third-party content into multiple separate tasks that are respectively assigned to two or more other computing devices in the distributed computing system.

3. The system of claim 2, wherein the two or more other computing devices are each configured to separately process the separate tasks that are respectively assigned to the two or more other computing devices, and electronically communicate results of the separate tasks to the server.

4. The system of claim 1, wherein the distributed computing system selects the at least two of various third-party content in response to a request for content to be integrated into the given electronic document.

5. The system of claim 4, wherein prior to receiving the request for content the distributed computing system evaluates multiple different combinations of available formatting and removes, from the available formatting, those combinations that will provide more than a specified level of prominence at a given location of the given electronic document to reduce the amount of time or computing resources required for the distributed computing system to select the formatting used to generate the visualization of the given third-party content.

6. The system of claim 5, wherein the distributed computing system removes, from the available formatting available for the given location of the given electronic document, at least one combination of available formatting that will provide the given third-party content a higher level of prominence than is obtainable by the given third-party content at a higher location of the given electronic document.

7. The system of claim 5, wherein the distributed computing system selects the combinations of available formatting that are eligible to be used on a per-query-segment basis based, at least in part, on how many different third-party contents are available to be distributed when each query is received, wherein the combinations of available formatting increase as a number of different available third-party contents increases.

8. A method of dynamically formatting visualizations of third-party content by a distributed computing system, the method comprising:

identifying a presentation opportunity for presentation of third-party content in various locations of a given electronic document presented at a user device;

evaluating, based on information related to the identified presentation opportunity, a corpus of electronically stored third-party content to identify third-party content eligible to be presented in the given electronic document;

selecting at least two of the various third-party content and determining a given level of prominence provided by a first presentation location of the given electronic document that is assigned to one of the at least two of the various third-party content for the particular presentation;

selecting, for a given third-party content that is assigned a second presentation location of the given electronic document that is assigned to one of at the least two of the various third-party content for the particular presentation, formatting of the given third-party content that increases a level of prominence of the given third-party content over the level of prominence that is provided by the second presentation location, but limits the level of prominence of the given third-party content to less than the given level of prominence provided by the first presentation location of the given electronic document;

dynamically generating a visualization of the given third-party content using the formatting that was selected for the given third-party content; and transmitting, to the user device, machine readable instructions that automatically cause the user device to present the visualization of the given third-party content according to respective formatting that was selected for the given third-party content.

9. The method of claim 8, further comprising receiving a request for content to be integrated into the given electronic document, wherein the distributed computing system selects the at least two of the various third-party content, formats the at least two of the various third-party content, and transmits the formatted at least two of the various third-party content after receiving the request for content to be integrated into the given electronic document.

10. The method of claim 9, further comprising:
prior to receiving the request for content, evaluating, by the distributed computing system, multiple different combinations of available formatting; and removing, from the available formatting and by the distributed computing system, those combinations that will provide more than a specified level of prominence at a given location of the given electronic document to reduce the amount of time or computing resources required for the distributed computing system to select the formatting used to generate the visualization of the given third-party content.

11. The method of claim 10, further comprising:
determining, for an unformatted visualization of the given third-party content, a first level of prominence obtainable at the first presentation location of the given electronic document;

determining, for an unformatted visualization of the given third-party content, a second level of prominence obtainable at the given location of the given electronic document; and setting, for the given third-party content, the specified level of prominence based on the second level of prominence and how much higher the first level of prominence is than the second level of prominence.

12. The method of claim 11, wherein selecting, for the given third-party content, formatting used to generate the visualization of the given third-party content is based on the second level of prominence.

13. The method of claim 10, further comprising selecting the combinations of available formatting that are eligible to be used on a per-query-segment basis based, at least in part, on how many different third-party contents are available to be distributed when each query is received.

14. The method of claim 13, wherein the combinations of available formatting increase as a number of different available third-party contents increases.

15. A non-transitory computer storage medium encoded with a computer program, the program comprising instructions that when executed by a distributed computing system cause the distributed computing system to perform operations comprising:

identifying a presentation opportunity for presentation of third-party content in various locations of a given electronic document presented at a user device;

evaluating, based on information related to the identified presentation opportunity, a corpus of electronically stored third-party content to identify third-party content eligible to be presented in the given electronic document;

selecting at least two of the various third-party content and determining a given level of prominence provided by a first presentation location of the given electronic document that is assigned to one of the at least two of the various third-party content for the particular presentation;

selecting, for a given third-party content that is assigned a second presentation location of the given electronic document that is assigned to one of at the least two of the various third-party content for the particular presentation; formatting of the given third-party content that increases a level of prominence of the given third-party content over the level of prominence that is provided by the second presentation location, but limits the level of prominence of the given third-party content to less than the given level of prominence provided by the first presentation location of the given electronic document;

dynamically generating a visualization of the given third-party content using the formatting that was selected for the given third-party content; and transmitting, to the user device, machine readable instructions that automatically cause the user device to present the visualization of the given third-party content according to respective formatting that was selected for the given third-party content.

16. The non-transitory computer storage medium of claim 15, the operations further comprising receiving a request for content to be integrated into the given electronic document, wherein the distributed computing system selects at least two of the various third-party content, formats the at least two of the various third-party content, and transmits the formatted at least two of the various third-party content after receiving the request for content to be integrated into the given electronic document.

17. The non-transitory computer storage medium of claim 16, the operations further comprising:

prior to receiving the request for content, evaluating, by the distributed computing system, multiple different combinations of available formatting; and removing, from the available formatting and by the distributed computing system, those combinations that will provide more than a specified level of prominence at a given location of the given electronic document to reduce the amount of time or computing resources required for the distributed computing system to select the formatting used to generate the visualization of the given third-party content.

18. The non-transitory computer storage medium of claim 17, the operations further comprising:

determining, for an unformatted visualization of the given third-party content, a first level of prominence obtainable at the first presentation location of the given electronic document;

determining, for an unformatted visualization of the given third-party content, a second level of prominence obtainable at the given location of the given electronic document; and setting, for the given third-party content, the specified level of prominence based on the second level of prominence and how much higher the first level of prominence is than the second level of prominence.

19. The non-transitory computer storage medium of claim 17, the operations further comprising selecting the combinations of available formatting that are eligible to be used on a per-query-segment basis based, at least in part, on how many different third-party contents are available to be distributed when each query is received.

20. The non-transitory computer storage medium of claim 19, wherein the combinations of available formatting increase as a number of different available third-party contents increases.

* * * * *